A. P. McKAY.
DISK PLOW.
APPLICATION FILED FEB. 5, 1916.
1,189,982.
Patented July 4, 1916.
3 SHEETS—SHEET 1.
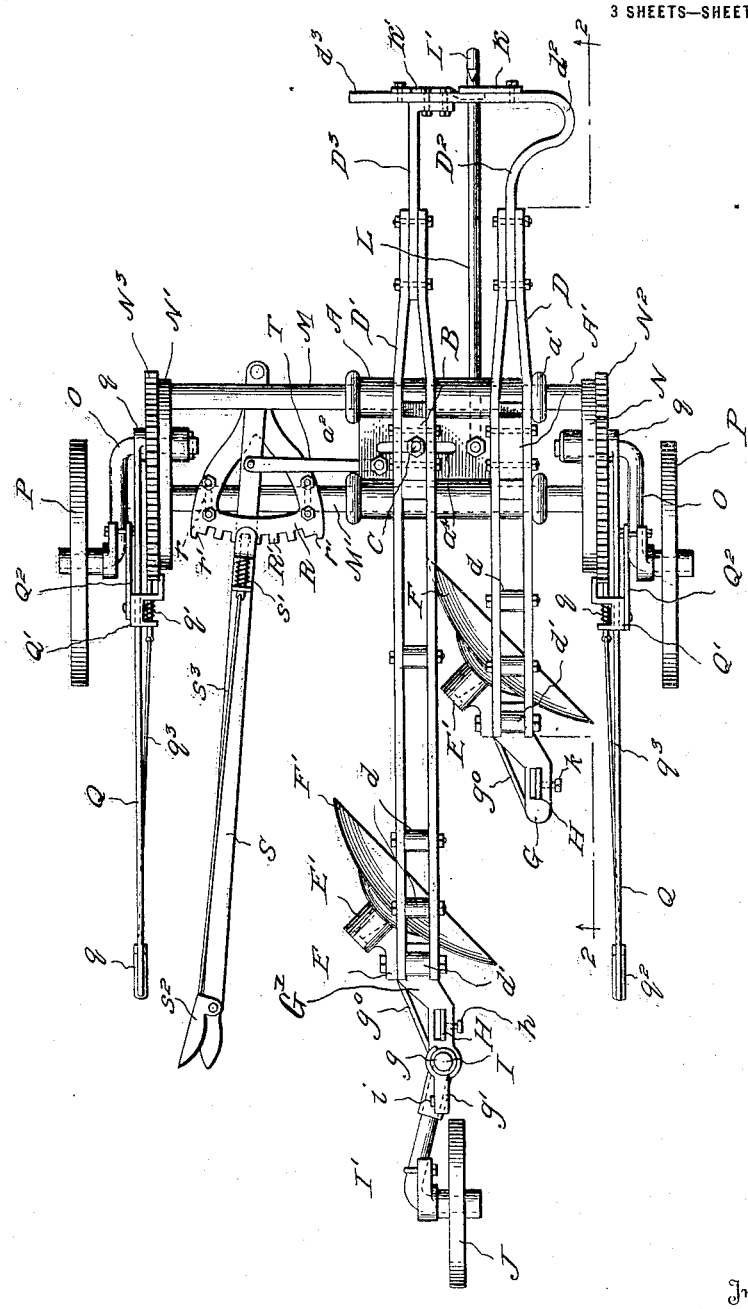
Witnesses
Paul M. Hunt
Edwin J. Beller
Inventor
Augusta P. McKay.
By Wilkinson, Guista & MacKaye,
Attorneys

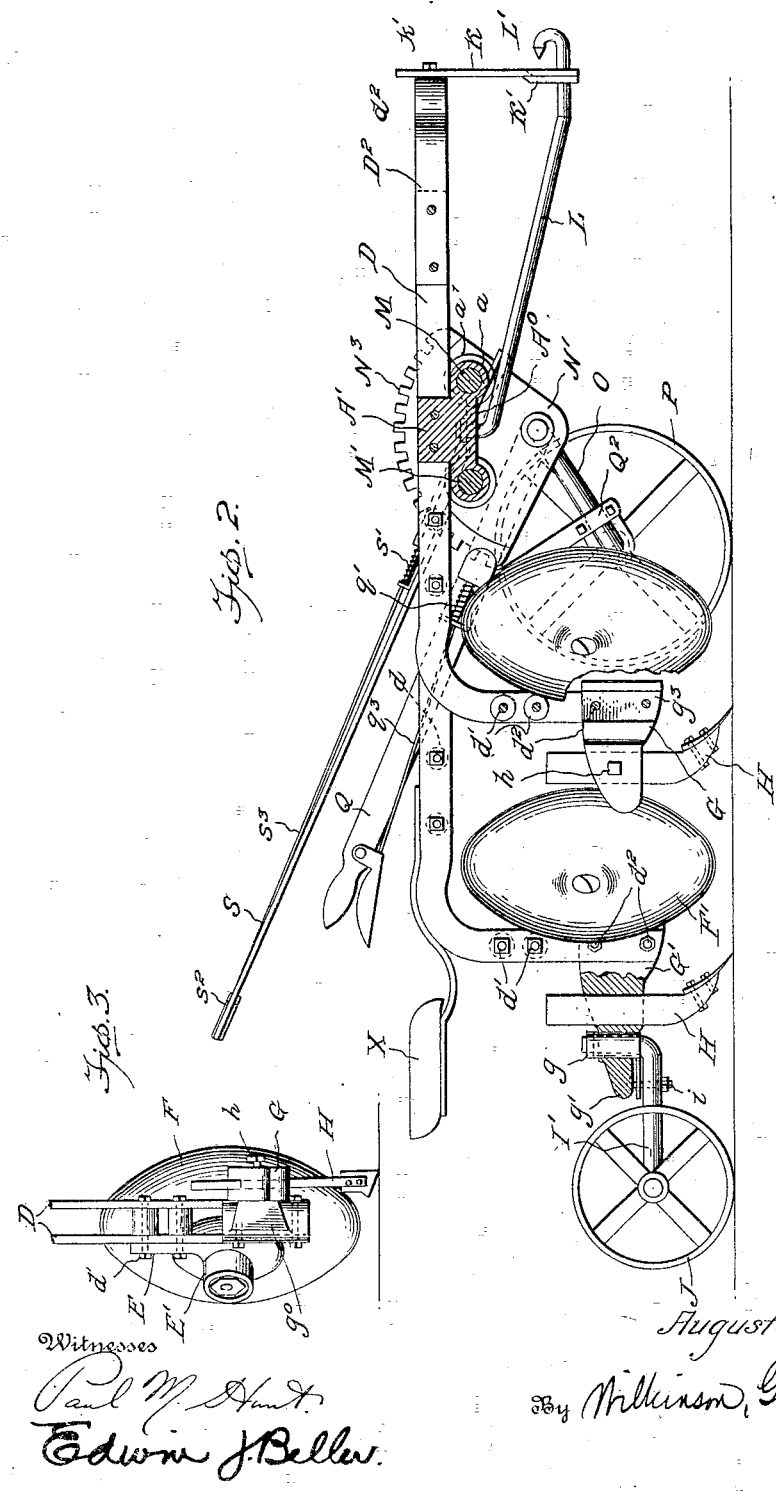

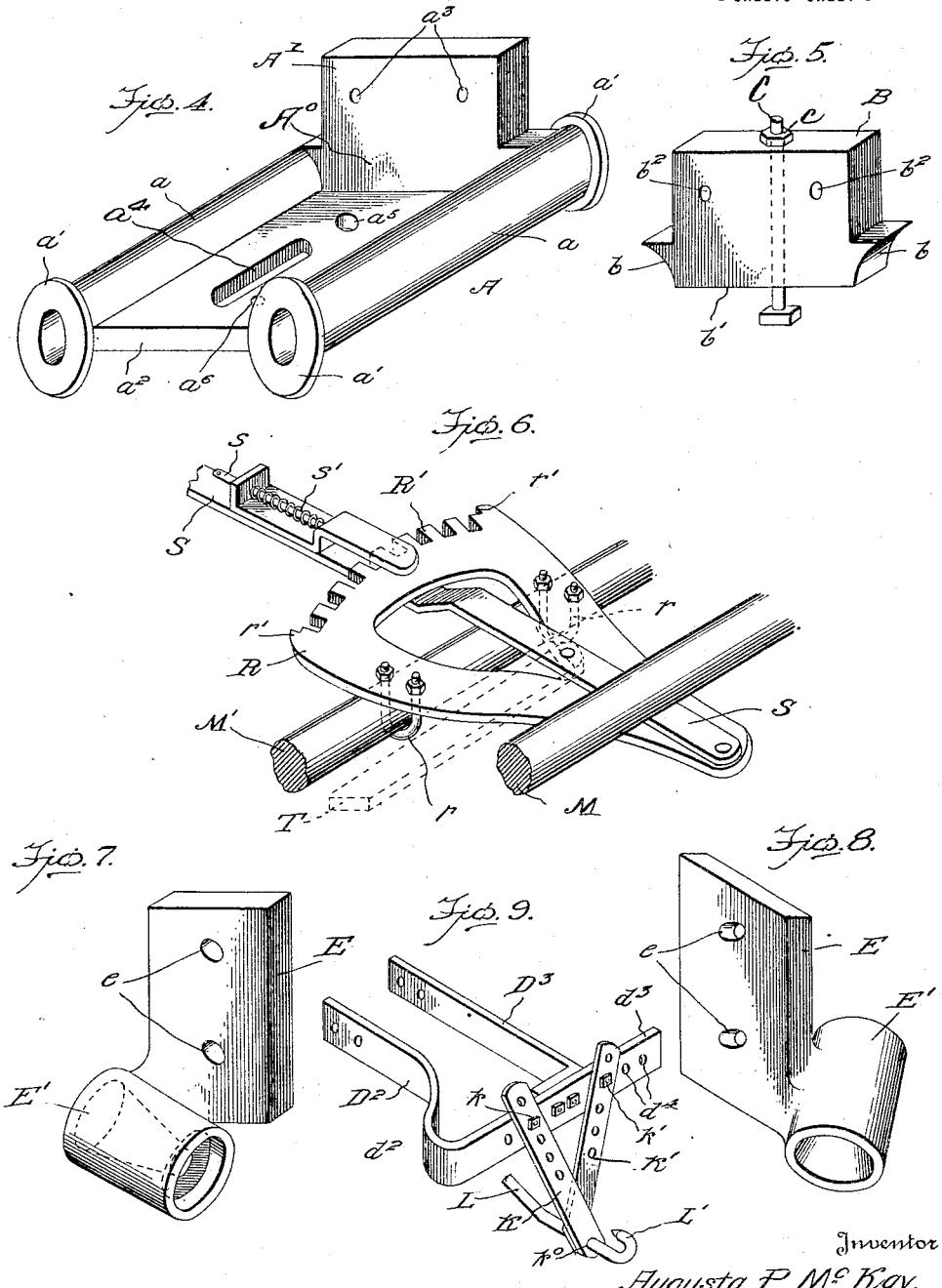

UNITED STATES PATENT OFFICE.

AUGUSTA P. McKAY, OF ROME, GEORGIA, ASSIGNOR TO McKAY DISC PLOW CO., OF ROME, GEORGIA, A CORPORATION OF GEORGIA.

DISK PLOW.

1,189,982.  Specification of Letters Patent.  Patented July 4, 1916.

Original application filed July 7, 1915, Serial No. 38,495. Divided and this application filed February 5, 1916. Serial No. 76,385.

*To all whom it may concern:*

Be it known that I, AUGUSTA P. McKAY, a citizen of the United States, residing at Rome, in the county of Floyd and State of Georgia, have invented certain new and useful Improvements in Disk Plows; and I do hereby declare the following to be a full, clear, and exact description of the invention, such as will enable others skilled in the art to which it appertains to make and use the same.

My present invention relates to improvements in disk plows and subsoilers, and it is intended to provide a framework and operative parts made of steel, iron, or other suitable metal, in which the width of the furrows may be varied within limits at will, and in which the disks and subsoil blades are so arranged, relative to the draft beam, that the tendency of the one to tilt the beam laterally in one direction is counterbalanced by the tendency of the other to tilt the beam in the opposite direction.

My invention is also intended to provide an arrangement of the character described, which shall be simple in construction and able to stand the rough usage and exposure to weather to which such implements are ordinarily subjected.

My invention also includes other novel features, and other novel arrangements and combination of parts, which will be more clearly understood after reference to the accompanying drawings, in which:—

Figure 1 is a plan view of the complete implement, omitting the seat and its attachment for the sake of clearness in the drawings; Fig. 2 shows a section through Fig. 1, along the line 2—2 of said figure, and looking in the direction of the arrows, the seat being shown in position; Fig. 3 is a rear view of the end of one of the draft beams, with the disk attachment and the subsoiler attachment connected thereto; Fig. 4 is a perspective view of the main casting which is carried by the main frame and supports the draft beams; Fig. 5 is a perspective view showing a detachable block, adapted to be adjustably attached to the main casting to permit the lateral adjustment of the draft beam connected thereto; Fig. 6 is a perspective view showing details of the shifting lever and its locking sector; Figs. 7 and 8 are perspective views showing the casting to which the disks are journaled; and Fig. 9 is a perspective view showing the arrangement for adjusting the position of the draft rods.

A represents the main casting (shown in detail in Fig. 4), which is adapted to slide laterally on the main frame, and comprises two cylindrical sleeves $a$, one at each side, which sleeves are preferably flanged at each end, as at $a'$, and are connected together by the integral bed-plate $a^2$, and the head $A^\circ$ which projects upwardly to form the fixed block $A'$, which is perforated as at $a^3$ to receive bolts for attaching said block to the outer draft beam, as will be hereinafter described.

The bed-plate $a^2$ is provided with an elongated slot $a^4$ to engage the clamping bolt C of the movable block B, and with holes $a^5$ to engage the rear end of the draft rod L, and with the holes $a^6$ to receive the pivot of the shifting strap T, as will be hereinafter more fully described.

The block B (shown in detail in Fig. 5) is provided with curved edges $b$ and a flat base $b'$ to adapt it to fit snugly, but slide freely, in the channel in the main casting formed between the side sleeves $a$ and the bed-plate $a^2$; and this block B is perforated to receive the clamping bolt C, and also is perforated, as at $b^2$, to receive bolts attaching the same to the draft beam D'.

In the drawings I have shown two draft beams, the one, D, securely attached to the block A' projecting upward from the end of the main casting, and the other draft beam D' secured to the movable block B which is adjustably mounted on the main casting by means of the clamping bolt C and nut $c$, which clamping bolt passes through the elongated slot $a^4$ in the main casting A. These draft beams D and D' are of substantially similar construction, except that the inner draft beam is longer than the outer, so as to stagger the disk and subsoiler attachments. These draft beams are preferably made of trussed construction, in which parallel bars are used, spaced apart by thimbles $d$ and secured together by bolts passing through said thimbles. The rear end of each draft beam is bent to project downward, as shown in Fig. 2, and to this downwardly projecting portion the castings or journal bearing blocks E, for the disks F and F', are attached; and at the lower end of the heel of each draft beam the housing block or casting for the shank H of the subsoiler is secured.

The construction of the journal bearing blocks E for the disks F and F' is shown in detail in Figs. 7 and 8. These blocks E are set off to the left of the draft beam, while the subsoiler housings G and G' are set off to the right of the draft beam, as shown most clearly in Figs. 1 and 2, so that any lateral pressure on the disks, tending to twist the beam laterally, will be compensated for by the counterbalancing pressure on the subsoilers. This arrangement causes the subsoiler point to run directly in the bottom of the disk furrow, and also balances the twisting effect of the plow disk and the subsoiler as described. The blocks E are secured to the left side of the respective draft beams by means of the bolts $e'$ passing through the bolt holes $e$, and the disk is journaled in the bearing E' and its journal is secured therein in the usual way.

The two subsoiler housings G and G' are substantially similar, except that the housing G' is provided with a journal bearing $g$ for the gooseneck I of the trail wheel, see Fig. 2, and with a tail lug $q'$ adapted to engage the stop $i$ carried by the rearwardly-projecting curved bar or gooseneck I', to which the wheel J is journaled in the usual way. This stop permits the trail wheel to swing to the left and to follow the furrow cut, and also permits it to swing to the left in turning the implement.

The housing blocks G and G' are preferably curved, as shown in Figs. 1, 2 and 3, and provided with a reinforcing web $g°$. The front ends of these blocks slip between the ends of the side bars constituting the draft beams, and are held in place by means of the bolts $d^2$. By this construction an extremely strong and rigid connection between the housing blocks for the subsoilers and the lower ends of the draft beams is secured. These housing blocks G and G' are provided with rectangular slots G° therethrough for the shanks of the subsoilers, which shanks are held in place by set screws $h$.

The depth to which the subsoilers are to cut is readily adjusted by easing up on the clamp screws $h$, moving the shanks to the desired position and clamping the same. These slots G° in the housing blocks G and G' are preferably set at a slight angle to the perpendicular, so as to throw the foot of the subsoiler outward as shown in Fig. 3. This increases the leverage at which the subsoiler acts to counterbalance the twisting effect of the disk which acts in the opposite direction, as will be evident from examining Fig. 3.

The seat X is attached to one of the draft beams in the usual or any convenient way.

The main casting A slides on the main frame, which is composed of the two transverse bars M and M' connected together at opposite ends by the sector plates N and N' carrying the sectors $N^2$ and $N^3$, respectively. These sector plates and sectors with the bars M and M' form a rigid frame, in which the stub axles O of the wheels P are journaled. Pivoted as at $q$ on these axles O are the levers Q carrying the housing Q', in which the spring pawls $q'$ are mounted, which spring pawls are connected by the rods $q^3$ to the handles $q^2$. These housings Q' are connected by links $Q^2$ to the stub axles near the hubs of the wheels, as shown in Figs. 1 and 2, and by withdrawing the pawl $q'$, and raising or lowering on the lever Q, either end of the main frame may be raised or lowered relative to the hub of its wheel, as desired; and thus the main frame may be kept parallel with the ground while the furrow wheels P and J are running in their respective furrows.

In order to shift the main casting A laterally on the main frame, I provide a sector R secured to the cross bar M' by means of the U-bolts and nut, and projecting forward beneath the front cross bar M. Pivoted to the forward portion of this sector R is the shifting lever S, which is connected to the main casting A by means of the link T. It will be obvious that swinging this lever S to the right, or to the left, will move the casting A along the cross bars M and M', thus varying the width of the first furrow as desired. The width of the second furrow is varied by easing up on the clamp bolt C, moving the beam D' to the right or left, as desired, and then setting up on the nut $c$ on the clamp bolt C, clamping the beam D' in the proper position.

The shifting lever S is provided with a suitable spring pawl $s'$ adapted to engage the teeth R' of the sector R, which sector is preferably provided with end lugs $r'$ to prevent the pawl from being thrown entirely off of the sector, see Fig. 6. This spring pawl is operated by the rod $s^3$ and handle $s^2$, as shown in Fig. 1.

The forward end of the beam D is provided with a curved bar $D^2$, held between the side plates as shown in Fig. 1. This bar is curved, as at $d^2$, to give the desired resiliency when the two beams are spread apart, and extends transversely across the front of the implement, as shown at $d^3$ in Fig. 1. Connected to this portion $d^3$ of the bar $D^2$ is the L-shaped bar $D^3$ which is secured between the side bars of the draft beam D'. The portion $d^3$ of the bar $D^2$ is provided with a series of perforations $d^4$, as shown in Fig. 9, through which pass the bolts $k$ and $k'$ for adjustably supporting the metal straps K and K', which are perforated at the lower ends, as at $k°$, to permit the passage therethrough of the draw-bar L, whose lower rear end is secured to the main casting A, and whose forward end is provided with a hook L′, or any other suitable device, for connecting the same to the source of motive power, such as a team of animals, a tractor engine, a pull-rope, or the like. By this arrangement the forward end of the draw-bar may be raised or lowered, or moved to the right or left, so as to adjust the hook L′ to the proper position for hooking on to the team, or other source of motive power, and to get the line of pull on this draw-bar in the proper direction.

The operation of the device is as follows:—The width of the furrow being predetermined, set the draft bar D′ at the proper distance from the bar D, which may be done by means of the clamp bolt C and nut c, and then by means of the shifting lever S move the main casting so that the bar D shall be at the proper distance from its end of the main frame, which will determine the width of the first furrow; the distance between the two bars D and D′ determining the width of the second furrow. Then release the spring pawl s′, hook on the implement to the team, or tractor engine, and the parts are ready for the operation of plowing. Either end of the frame may be raised or lowered by means of the hand levers Q, so as to set the main frame in the proper position relative to the surface of the ground.

While I have shown two draft beams D and D′, with the implements attached thereto, it will be obvious that, by simply lengthening the main casting A, one or more additional beams may be mounted on said casting, in which event, of course, the main frame would have to be lengthened transversely to permit the increased length of the main casting A. It will be seen that the sector R may be moved to any desired position on the cross bar M′ by simply easing up on the nuts of the U-bolts r, sliding the sector to the desired position and clamping the U-bolts in place again. In this way the length of vibratory movement of the main casting A on the main frame may be varied beyond the limits possible where the sector, on which the shifting lever is mounted, is secured at a given point only on the main frame.

It will be obvious that various modifications might be made in the herein described apparatus, and in the construction, combination and arrangement of parts which could be used without departing from the spirit of my invention.

Having thus described my invention what I claim and desire to secure by Letters Patent of the United States is:—

1. In an agricultural implement, of the character described, the combination with a main frame provided with cross bars, of a main casting adapted to slide laterally upon said bars, and provided with sleeves engaging said bars, draft beams supported on said main casting, with means carried by said casting for varying the distance between said draft beams, and a tillage implement carried by each draw beam near the rear end thereof, substantially as described.

2. In an agricultural implement of the character described, the combination with a main frame provided with cross bars, of a main casting adapted to slide laterally upon said bars, and provided with sleeves engaging said bars, draft beams supported on said main casting, with means carried by said casting for varying the distance between said draft beams, means for shifting said casting laterally, and a tillage implement carried by each draft beam near the rear end thereof, substantially as described.

3. In an agricultural implement of the character described, the combination with a main frame provided with cross bars, of a main casting adapted to slide laterally upon said bars, and provided with sleeves engaging said bars, draft beams supported on said main casting, with means carried by said casting for varying the distance between said draft beams, means for shifting said casting laterally comprising a sector secured to said main frame, a shifting lever pivoted to said sector, and provided with a pawl engaging said sector, a link connecting said shifting lever and said casting, and a tillage implement carried by each draft beam near the rear end thereof, substantially as described.

4. In an agricultural implement of the character described, the combination with a main frame provided with cross bars, of a main casting adapted to slide laterally upon said bars, and provided with sleeves engaging said bars, a web connecting said sleeves with a slot therein parallel to said sleeves, and a lug projecting upward from one end of said web, a block slidably mounted on said web between said sleeves, a clamp bolt passing through said block and adapted to clamp same to said web, a draft beam supported by said main casting and secured to said lug, and a second draft beam secured to said slidable block and also supported by said main casting, with means for shifting said main casting transversely of said frame, substantially as described.

5. In an agricultural implement of the character described, the combination with a main frame provided with cross bars, of a main casting adapted to slide laterally upon said bars, and provided with sleeves engaging said bars, a web connecting said sleeves with a slot therein parallel to said sleeves, and a lug projecting upward from one end of said web, a block slidably mounted on said web between said sleeves, a clamp bolt passing through said block and adapted to clamp same to said web, a draft beam supported by said main casting and secured to said lug, and a second draft beam secured to said slidable block and also supported by said main casting, with means for shifting said main casting transversely of said frame, said means comprising a sector secured to said main frame, a shifting lever pivoted to said sector, and provided with a pawl engaging said sector, a link connecting said shifting lever and said casting, and a tillage implement carried by each draft beam near the rear end thereof, substantially as described.

6. In an agricultural implement of the character described, the combination with a main frame provided with cross bars, of a main casting adapted to slide laterally upon said bars, draft beams supported on said main casting, a resilient perforated plate connecting the forward ends of said draft beams, a pair of straps adjustably connected to said plate, and a draft rod forming a hinged joint with said straps, and secured at its rear end to said main casting, with means for varying the distance between said draft beams, and means for shifting said casting laterally on said main frame, substantially as described.

7. In a disk plow and subsoiler of the character described, the combination with a main frame provided with cross bars, of a main casting adapted to slide laterally upon said bars, draft beams supported on said main casting, a resilient perforated plate connecting the forward ends of said draft beams, a pair of straps adjustably connected to said plate, and a draft rod forming a hinged joint with said straps, and secured at its rear end to said main casting, with means for varying the distance between said draft beams, and means for shifting said casting laterally on said main frame, said means comprising a sector secured to said main frame, a shifting lever pivoted to said sector, and provided with a pawl engaging said sector, a link connecting said shifting lever and said casting, and a tillage implement carried by each draft beam near the rear end thereof, substantially as described.

In testimony whereof, I affix my signature.

AUGUSTA P. McKAY.

Copies of this patent may be obtained for five cents each, by addressing the "Commissioner of Patents Washington, D. C."